Figure 1:
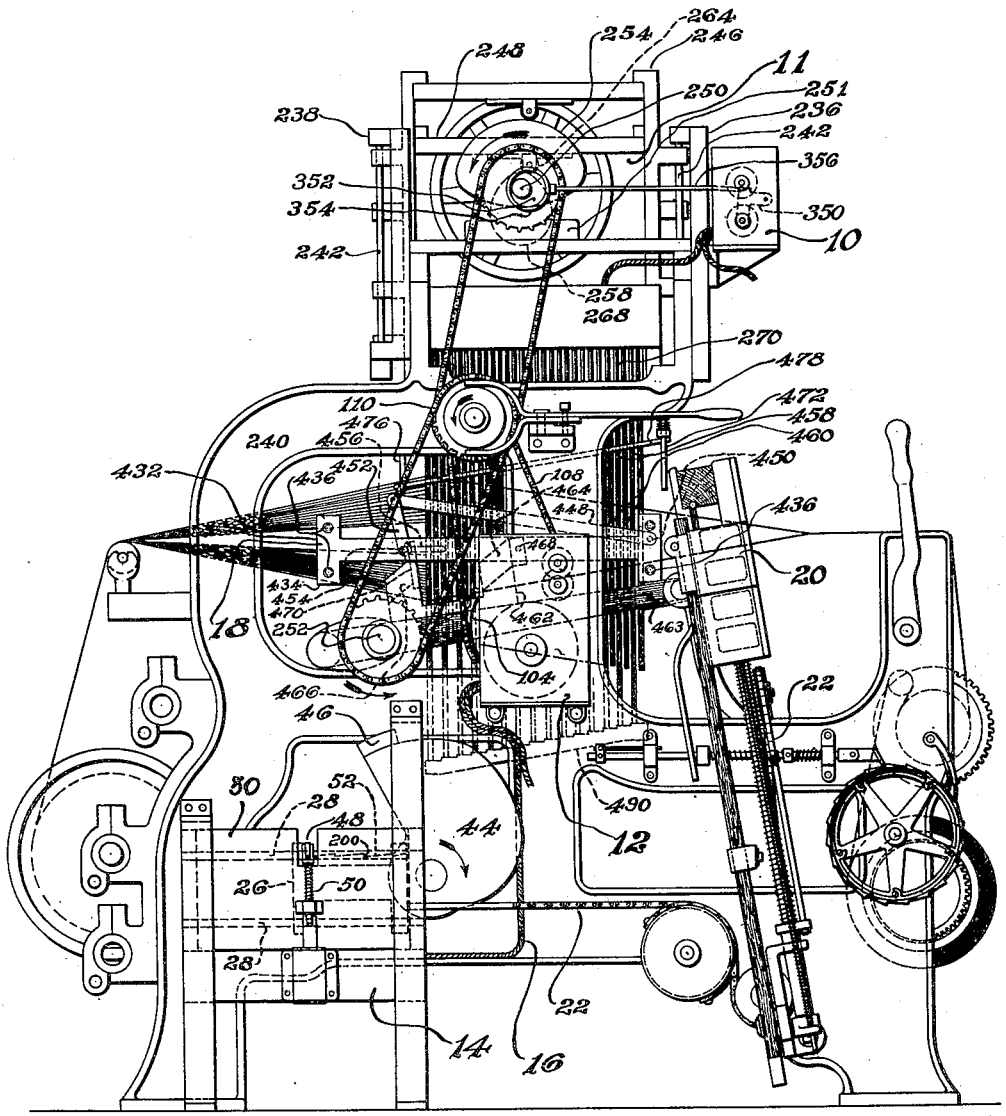

Jan. 25, 1938.     F. D. LINDQUIST     2,106,504
LOOM
Original Filed Nov. 26, 1932     11 Sheets-Sheet 1

Witness
Paul F. Bryant

Inventor
Frank D. Lindquist
by his attorneys
Van Everen Fish Hildreth Hary

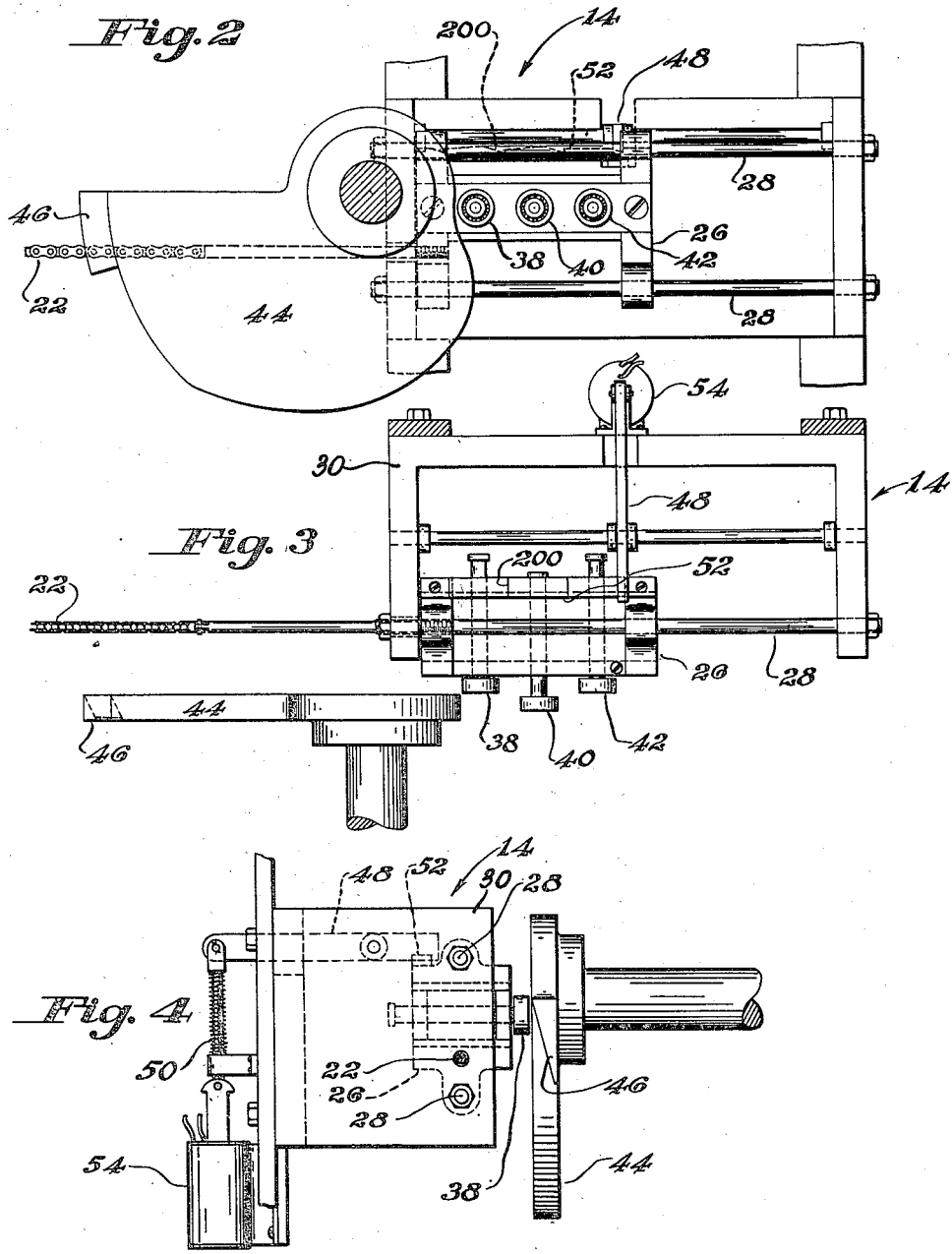

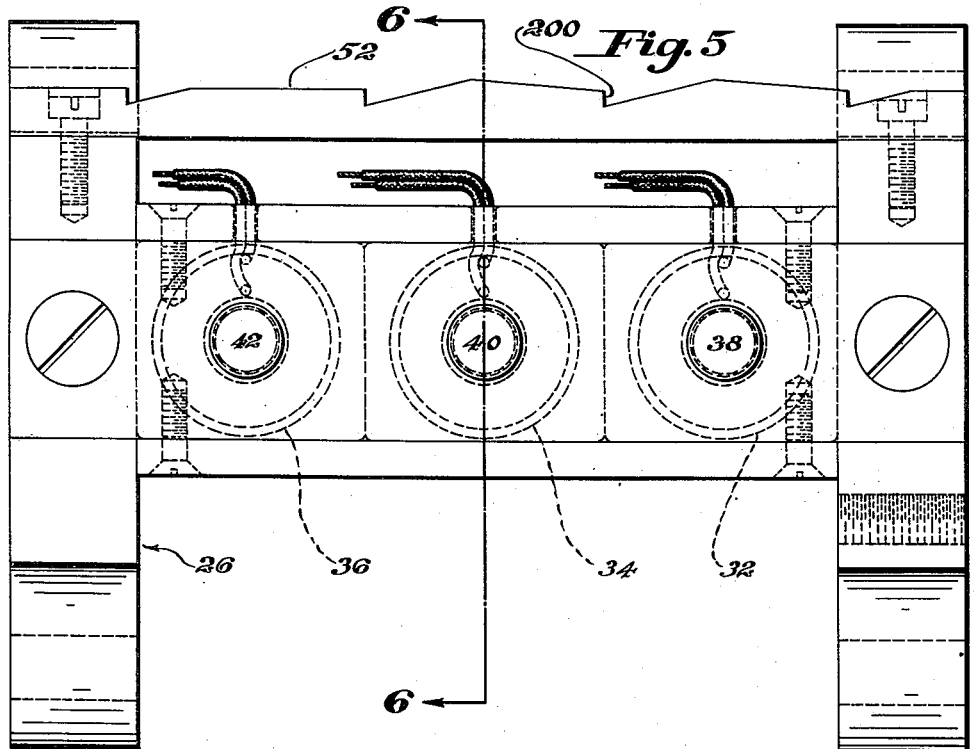
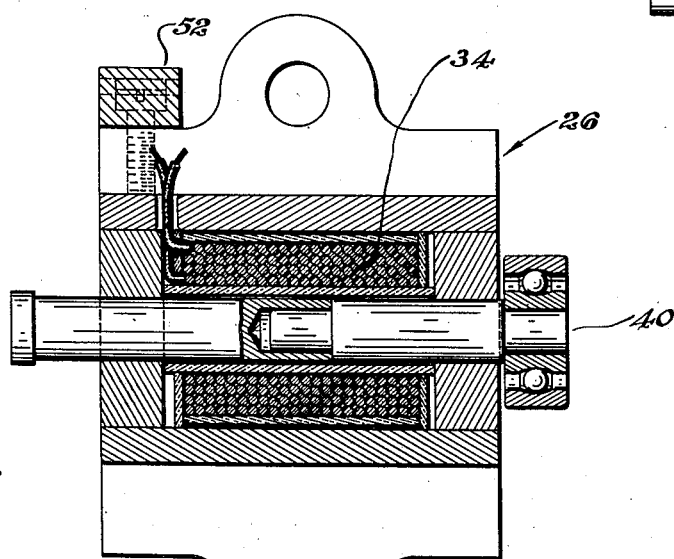

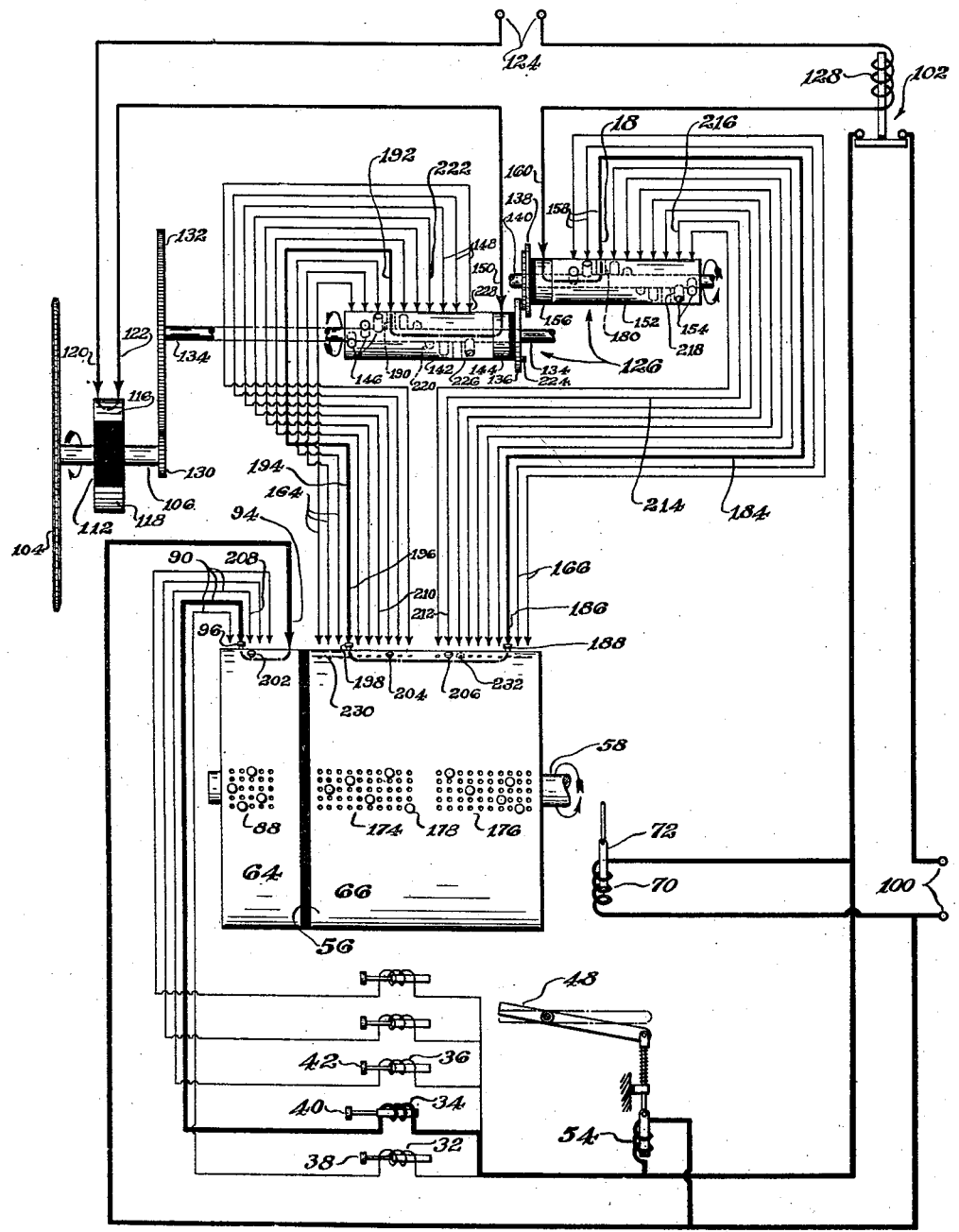

Jan. 25, 1938.   F. D. LINDQUIST   2,106,504
LOOM
Original Filed Nov. 26, 1932   11 Sheets-Sheet 5

Witness
Paul F. Bryant

Inventor
Frank D. Lindquist
by his attorneys
Van Everen Fish Hildreth & Cary

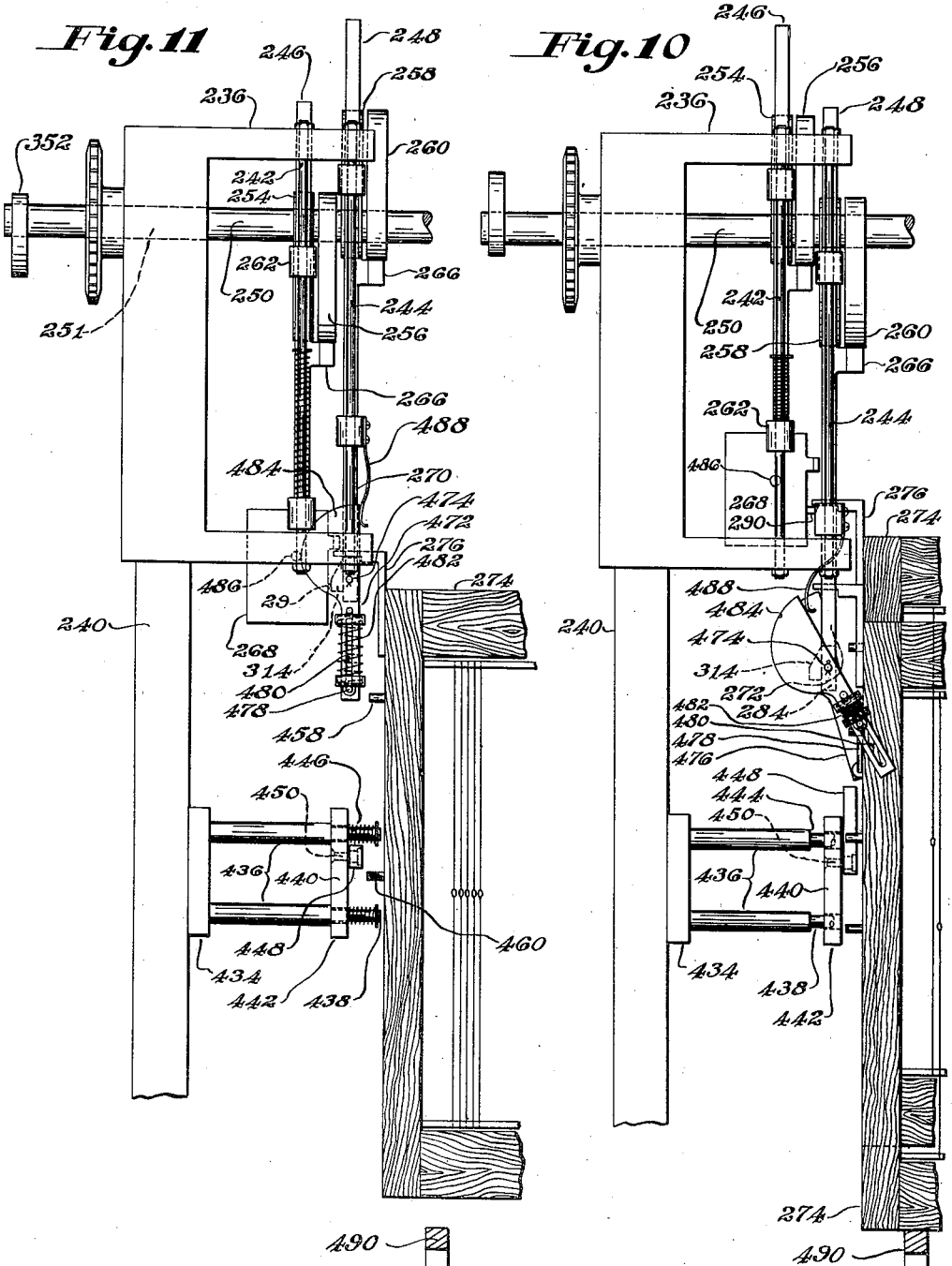

Jan. 25, 1938.　　　　F. D. LINDQUIST　　　　2,106,504
LOOM
Original Filed Nov. 26, 1932　　11 Sheets-Sheet 7
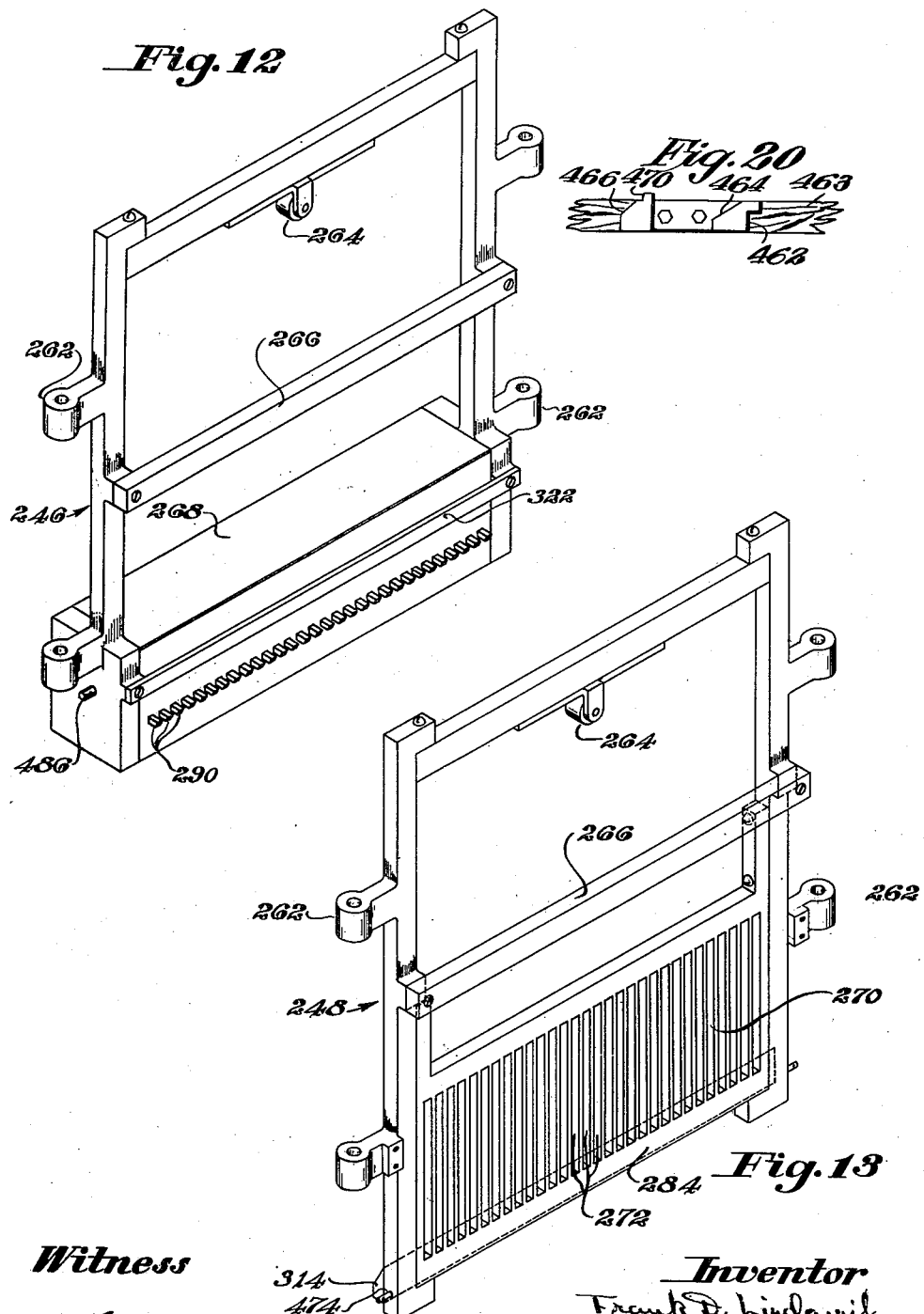
Witness
Paul F. Bryant
Inventor
Frank D. Lindquist
by his attorneys
Van Everen Fish Hildreth Harry

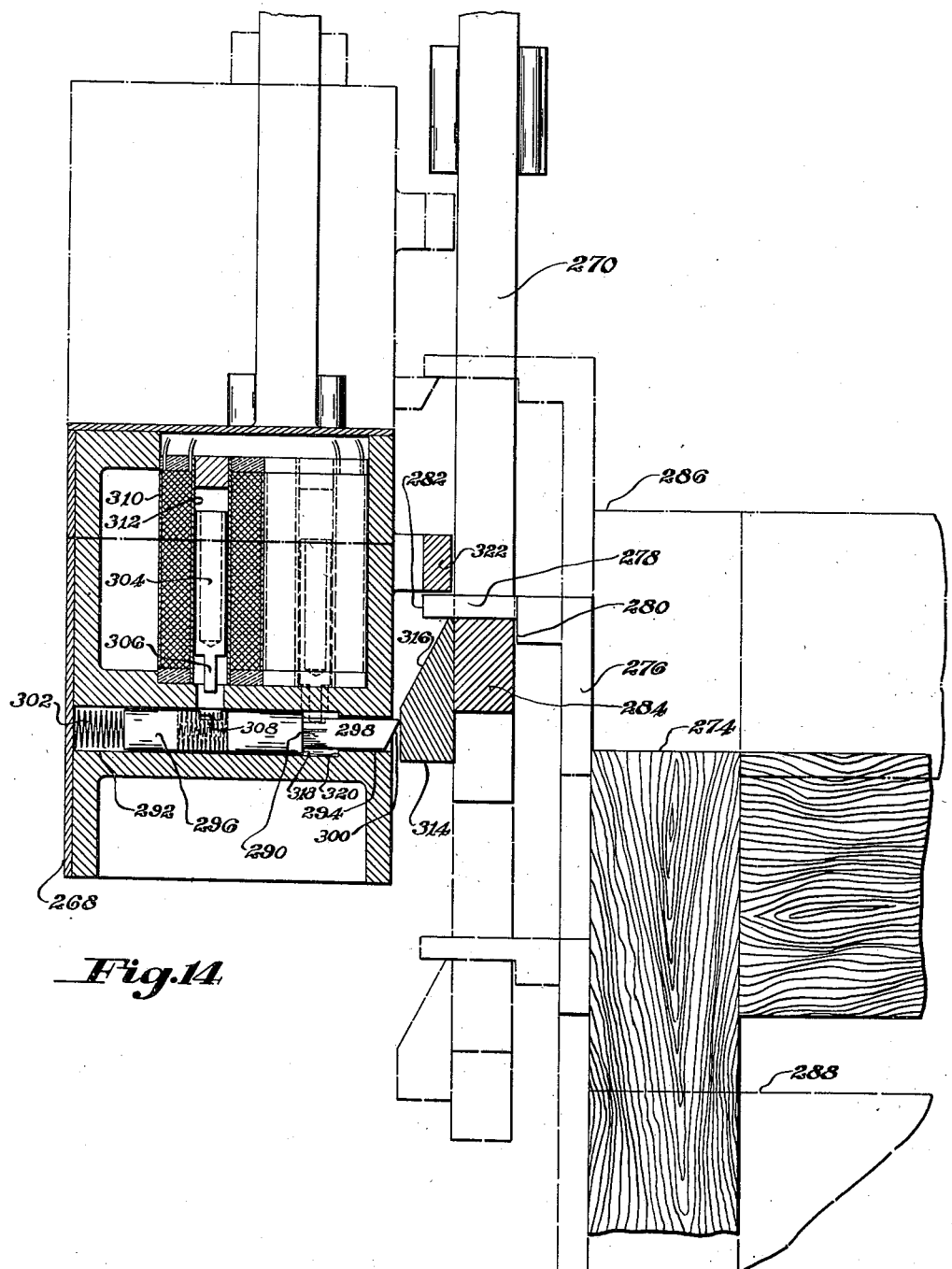

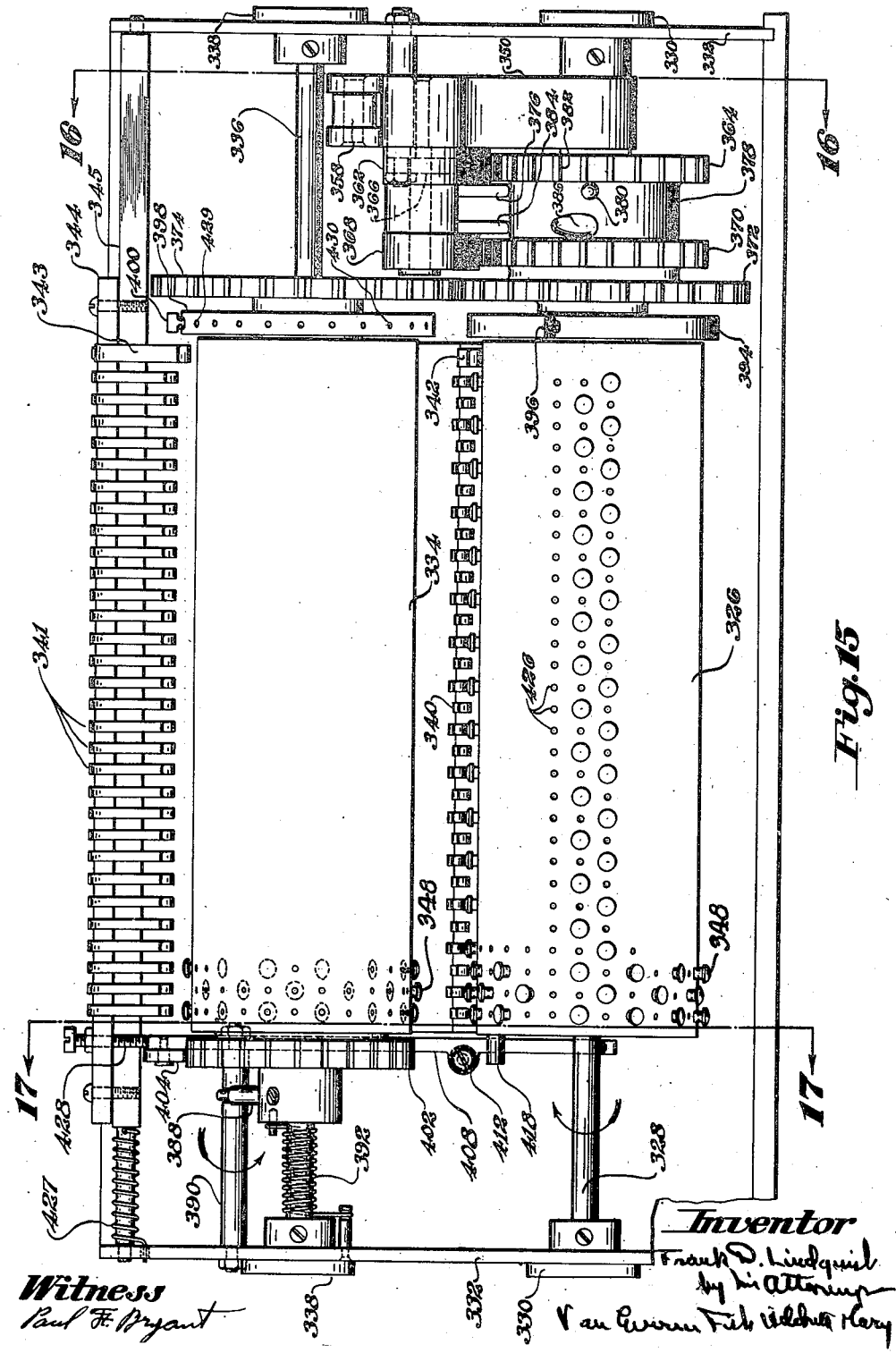

Jan. 25, 1938.  F. D. LINDQUIST  2,106,504
LOOM
Original Filed Nov. 26, 1932  11 Sheets-Sheet 10

Jan. 25, 1938.  F. D. LINDQUIST  2,106,504
LOOM
Original Filed Nov. 26, 1932  11 Sheets-Sheet 11

Witness
Paul F. Bryant

Inventor
Frank D. Lindquist
by his attorneys
Van Everen Fish Hildreth Cary

Patented Jan. 25, 1938

2,106,504

UNITED STATES PATENT OFFICE 2,106,504

LOOM

Frank D. Lindquist, Worcester, Mass.

Application November 26, 1932, Serial No. 644,459
Renewed July 2, 1937

9 Claims. (Cl. 139—55)

The present invention relates to looms, and more particularly to looms adapted for the weaving of fancy fabrics suitable for overcoatings, suitings, blankets and similar purposes.

It has been customary heretofore in looms of this type to employ long and cumbersome pattern chains which are designed to control the head motion for the harness in addition to the shuttle box which determines which one of several shuttles shall be operated upon successive picks. Not only does the substitution of these pattern chains involve a considerable amount of labor and time in changing over the loom from one pattern to another, but in addition the construction for operating the individual harness frames from the head motion is cumbersome, does not accurately position the harness frames, and places unequal and variable tensions upon the warp threads. Furthermore this type of construction is such that the wear upon the parts of the head motion and the harness frames themselves is greatly accelerated requiring constant and frequent replacement of parts.

One object of the present invention is to provide a loom of this character which shall be relatively simple in its construction and operation, and which shall be free in operation from undue maintenance cost due to replacement.

A further object of the invention is to provide an improved and different method of controlling both the harness frames and shuttles for a variety of fancy weaves in such a manner that modification or variation in the weave may be simply and easily obtained without the exercise of great skill or the expenditure of considerable amounts of time during which the loom is necessarily inoperative.

With these and other objects in view, one feature of the invention contemplates the provision of one or more controlling members operated in definite timed relation to that of the loom, and supplemented by pattern control capable of manipulation by the operator to get any desired pattern, and serving through appropriate electrical circuits to pre-select and control either or both the harness frames and shuttles.

A further feature of the invention contemplates the provision of direct connected cam mechanism for actuating the harness frames in timed relationship and in definitely predetermined paths to insure the formation at each pick of sheds of equal amplitude and without unusual strains upon individual warp threads. This head motion, as it may be termed, is complemented by electrically controlled harness selecting devices which serve to preselect harness frames according to a pattern control at each pick of the loom, certain of the frames being elevated and certain depressed to form a shed in a manner which will be obvious to those skilled in the art.

Still further features of the invention consist in certain novel features of construction, combinations and arrangements of parts hereinafter described and claimed, the advantages of which will be obvious to those skilled in the art from the following description.

Figure 8:
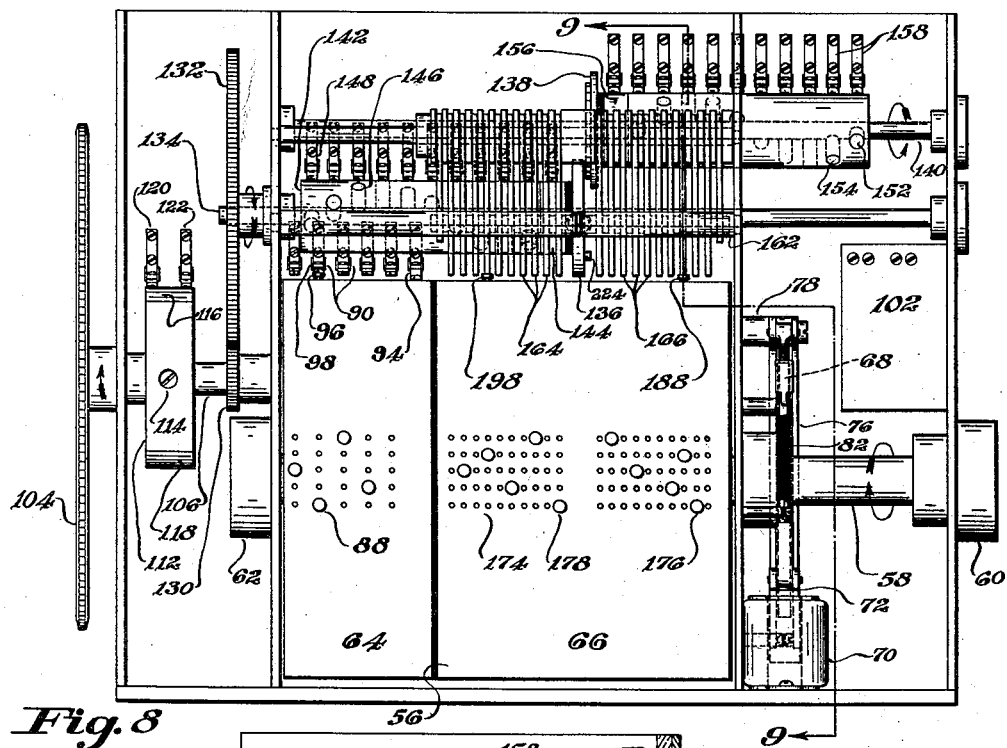
Figure 9:
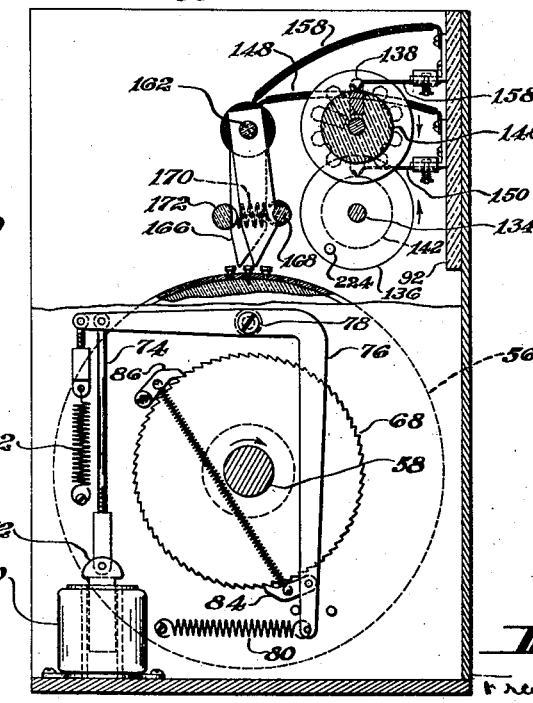
Figure 17:
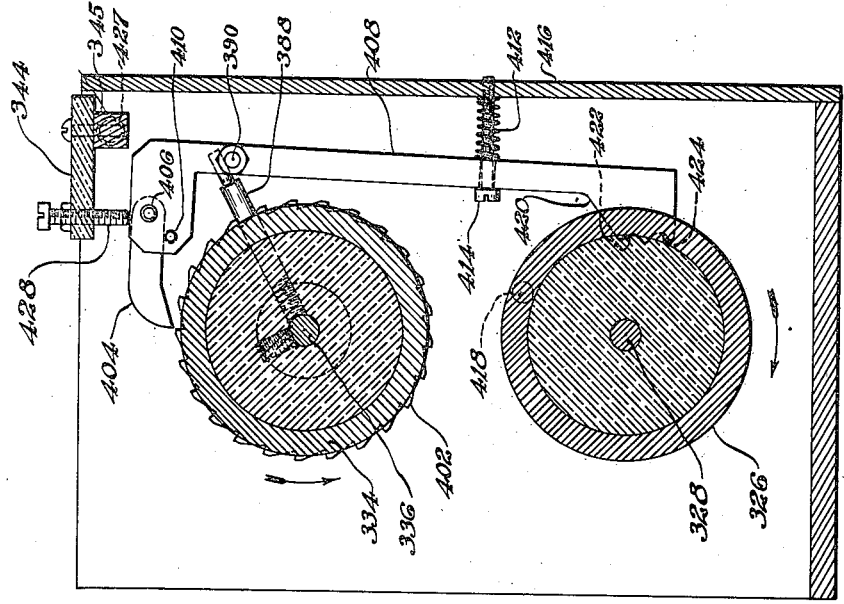
Figure 16:
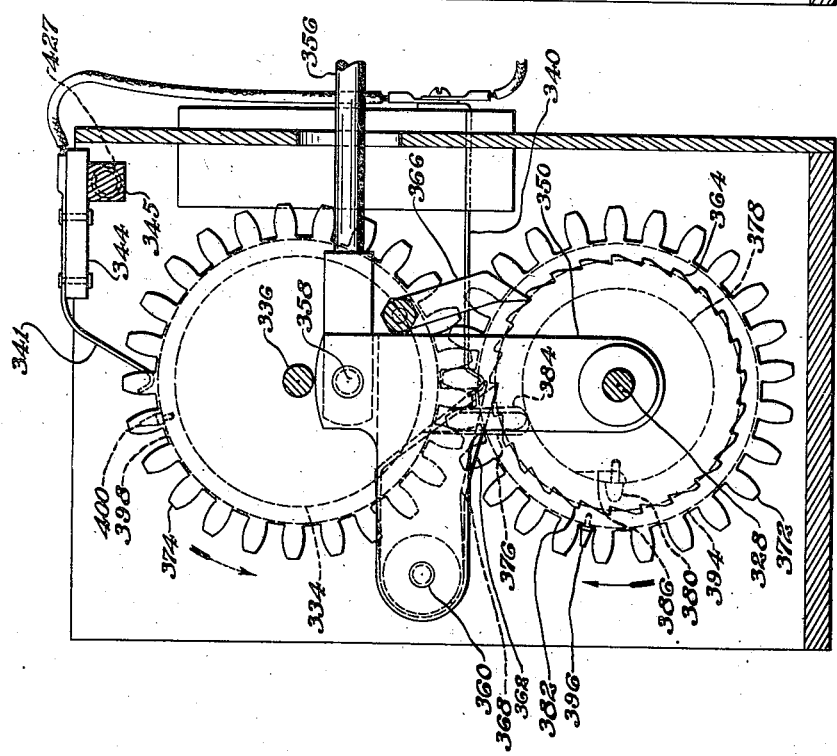
Figure 18:
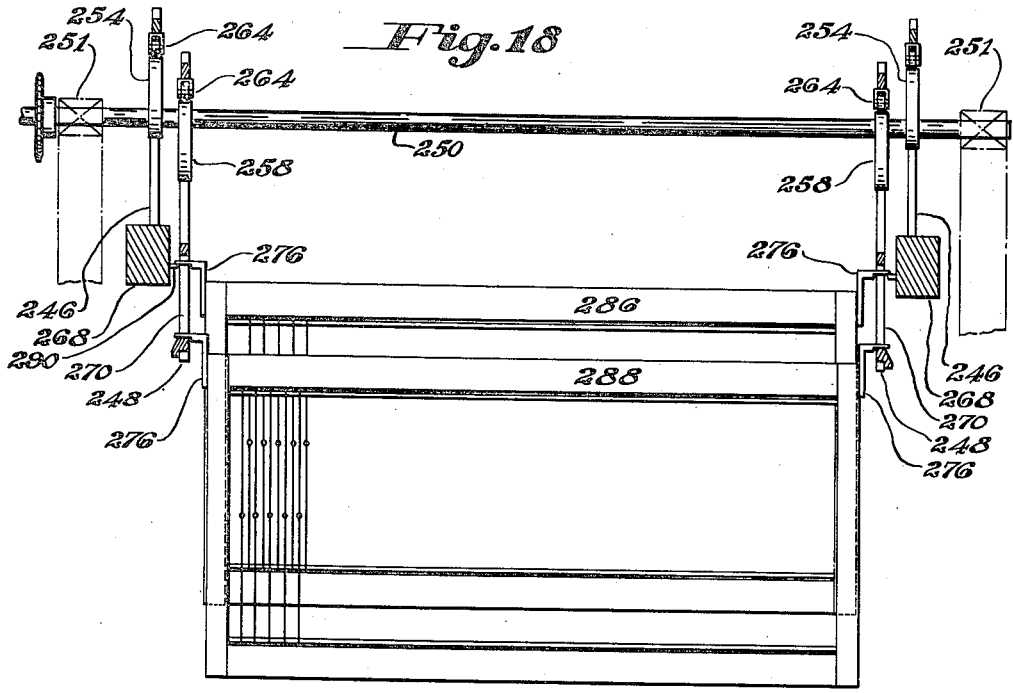
Figure 19:
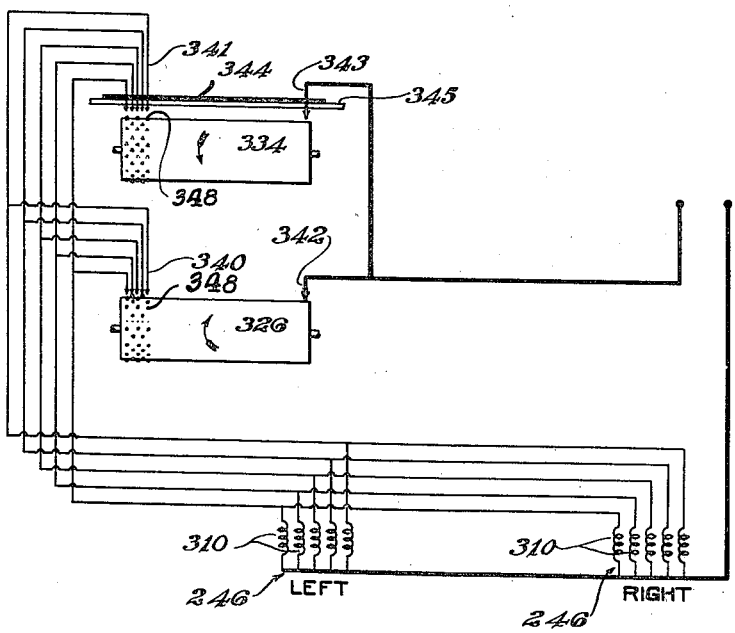

In the accompanying drawings illustrating the preferred form of the invention, Fig. 1 is an elevation of the head end of the loom; Fig. 2 is a right elevation of the box actuating mechanism; Fig. 3 is a plan view of the box actuating mechanism; Fig. 4 is a front elevation of the box actuating mechanism; Figs. 5 and 6 are detail views of a portion of the box actuating mechanisms; Fig. 7 is an electrical diagram of the electrical box control mechanisms; Fig. 8 is a rear elevation of the electrical box control mechanism; Fig. 9 is a section on line 9—9 of Fig. 8; Fig. 10 is a front elevation of the left head motion showing the harnesses in raised and lowered shedding positions; Fig. 11 is a view of the left head motion showing the harnesses in an intermediate position; Fig. 12 is a perspective view of the selective harness lifting slide of the head motion; Fig. 13 is a perspective view of the harness lowering slide; Fig. 14 is a fragmentary sectional elevation indicating by dotted lines the extreme movements of the harness selecting and lifting slide and the harness lowering slide; Fig. 15 is a front elevation of the harness control mechanism; Fig. 16 is a section on the line 16—16 of Fig. 15; Fig. 17 is a section on the line 17—17 of Fig. 15; Fig. 18 is a diagrammatic front elevation of the loom; Fig. 19 is an electrical diagram illustrating the method of connecting the electrical harness control mechanism to the selective harness lifting slides; and Fig. 20 is a fragmentary plan view of a part of the actuating mechanism of the machine.

According to the illustrated embodiment of the invention, the head motion and shuttle or drop box lifting mechanism are operated from separate and independent pattern controls, but both in timed relation to the operation of the loom, the pattern control in each case receiving its actuating impetus from a constantly moving part of the loom itself. Generally speaking, the shuttle box actuating mechanism comprises a commutator cylinder constantly rotated in timed relation with the operation of the loom and electrically connected with a pattern drum which is provided with a large number of recesses for the reception of manually located contact buttons for the purpose of imposing a definite and predetermined control on the drop box at each pick. The actual drop box lifting mechanism is controlled by a series of solenoids, one for each shuttle, each solenoid being included in a separate circuit. Upon closing of the main circuit at an appropriate pick through the employment of a button on the pattern drum, an appropriate solenoid circuit is simultaneously closed, this being controlled in turn by a second pattern drum in such a fashion as to lift the drop box to a definite position for the delivery of an appropriate shuttle into the shed. After each shuttle change the pattern drum is advanced one step to pre-select the appropriate shuttle when the next change occurs.

In actual practice, for the purpose of permitting automatic control of a larger number of picks than would otherwise be possible without great multiplication of the number of parts, the commutator cylinder is supplemented by a second cylinder operating at one-tenth of the speed of the first cylinder and electrically connected with a second series of contact buttons on the pattern drum in such a fashion that the first commutator cylinder in conjunction with its appropriate pattern drum controls a series of ten picks, whereas the operation of the second commutator cylinder and associated pattern drum controls the number of series of ten picks which will be traversed before changing of the shuttle course. Obviously the same result could be obtained with greater complication by providing a single commutator and pattern drum with a row of one hundred buttons thereon.

With this construction, the operation of the drop box and the delivery of pre-selected shuttles can be readily varied by altering the location and number of the contact buttons on the pattern drums. This might equally well be accomplished by setting up drums with appropriate buttons and substituting or replacing an old drum with a new one. In either event, the time during which the loom is inoperative, together with the amount of substitution, is reduced to a minimum. Furthermore, the mechanism is sufficiently flexible in its control and sufficiently broad in its scope to cover any and all possible variations of pattern which may be woven.

Operating in definite timed relation with the drop box control but independently thereof is a head motion or harness control somewhat similar in its general characteristics but differing in its structure features. This head motion control comprises likewise a pattern drum with provision for the manual insertion of contact buttons, this drum being intermittently advanced in timed relation to the operation of the loom. Complementing the operation of the control are oppositely moving frame slides at each end of the loom which are designed for control of the harness frames themselves. The upper slide of each set carries a series of solenoids corresponding in number to the number of harness frames. These solenoids are in turn electrically connected with the pattern drum in such a manner that at each pick pre-selected frames are elevated by the upper slide, and the remaining frames are dropped to the lower slide, the frames at all times being under complete control and held in predetermined alignment and parallelism. The slides themselves are cam operated in timed relation to the operation of the loom and are designed to form sheds of proper amplitude and to permit dwell of the harness frames during the throw of the shuttle within the shed. For the purpose of increasing the scope of the head motion and permitting a pattern variation which may embrace forty-eight picks in the loom without repeating, I complement the pattern drum with a second drum of similar dimensions, and design the two drums in such a manner that the first drum is intended to cover twenty-four successive picks of the loom, and the second drum to pick up and control the operation for any succeeding number of picks up to forty-eight. In the event that the pattern is completed in less than twenty-four picks, I also employ the second drum to supplement the operation of the first drum. For example, if the pattern is to be completed in twenty picks, I duplicate the first four picks on the first drum, and thereafter transfer the control of the remaining sixteen picks to the second drum for the purpose of completing the second pattern cycle. Upon the third cycle the control is transferred entirely to the first drum, and the fourth cycle thereafter repeats the second. The mechanism for controlling these drums will be described more fully hereinafter.

In Fig. 1 the harness control mechanism 10 is shown as being mounted at the right of the head motion 11, and the box lifting mechanism 12 may be mounted where convenient. The box actuating mechanism is indicated at 14 and is connected electrically to the box lifting control mechanism 12 by an electric cable 16. Harness evener mechanisms are indicated at 18.

The conventional drop-boxes 20 are connected by means of chains 22 to the box actuating mechanism 14. This mechanism is illustrated in detail in Figs. 2 to 6. The chain 22 is connected to a cam follower block 26 sliding upon two rods 28 mounted in the frame 30. The cam follower block contains three solenoids 32, 34 and 36 having cam follower cores 38, 40 and 42. Upon momentary energization of one of the solenoids, the corresponding cam follower is moved into the plane of a disc cam 44. This cam is mounted on the end of the bottom shaft of the loom, which makes one revolution for every pick. It will therefore be seen that the cam follower block is capable of occuping any one of four different progressive positions; first, the initial position as illustrated in Figs. 2, 3 and 4. Second, a position to which the cam 44 would slide the follower block should the cam follower 38 be moved into the plane of the cam. The third and fourth positions are obtained similarly. When the cam follower block is in the position illustrated, the first or top boxes are in picking position. When the cam follower 38 is actuated, the second boxes are raised to picking position. After positioning of the cam follower block, the cam follower which has been actuated, is forced from the plane of the cam by a wedge 46 mounted on the face of the cam. A latch mounted upon a stationary fulcrum rod 48, is by a spring 50 normally held in engagement with a ratchet bar 52 fastened to the top of the cam follower block 26. The purpose of this latch is to retain the drop boxes in a given position for the desired number of picks of a given color. When it is desired to bring a different box into picking position, the latch is automatically disengaged by means of a latch release solenoid 54 which is controlled by a box motion control mechanism, hereinafter described. As viewed in Fig. 1, the release of the latch 48 causes the cam follower block 26 to move from left to right (under the influence of the usual springs and the weight of the drop boxes). The latch release solenoid 54 and cam follower block solenoids 32, 34 and 36, are connected in parallel as shown in Fig. 7, and therefore the return of the drop boxes to the extreme lower or normal positions and the insertion of one of the cam followers 38, 40 or 42 into the path of the cam 44, occur simultaneously.

The electric box motion control mechanism as illustrated in Figs. 7, 8 and 9, is so designed that it may be used with drop boxes containing as many as six shuttle boxes each. The loom is illustrated with 4 x 4 drop boxes, and the box actuating mechanism is designed for use with this particular loom. As explained above, in order to change the position of the drop boxes, it is necessary to momentarily energize the latch release solenoid and a selected cam follower solenoid of the box actuating mechanism. However, if the first or top shuttle is to next come into use, it is only necessary to release the latch, no selecting or energizing of a cam follower being necessary for this initial position.

In Fig. 8 is shown a drum 56 fixed upon a rotatable shaft 58 journaled in bearings 60 and 62. The drum consists of two separate cylindrical metallic sleeves 64 and 66 mounted upon a large core of fibrous insulating material. The drum is intermittently rotated by means of a solenoid operated pawl and a ratchet 68 having seventy-two teeth. A solenoid 70 having a movable core 72 is connected by means of a link 74 to a bell-crank lever 76 mounted upon a pivot 78. The bell-crank is normally held in the position shown in Fig. 9 by a relatively strong tension spring 80. The effective force of the spring 80 is controlled by an opposing adjustable tension spring 82 fastened to the opposite end of the bell-crank. A spring-pressed pawl 84 pivoted to the bell-crank advances the ratchet one tooth or five degrees for each action of the solenoid, and a check pawl 86 prevents retrogressive motion of the ratchet. Note that motion is imparted to the ratchet and to the drum 56 only upon de-energization of the solenoid 70, and that the motive power which advances the ratchet is stored in the spring 80, and becomes effective only when the core 72 is released.

The sleeves 64 and 66 are perforated, the holes being arranged in circles and lines as shown. Each circle consists of seventy-two holes five degrees apart. The sleeve 64 is shown with five circles of holes, but the first three circles are the only ones used on this particular loom. The holes are adapted to receive metallic buttons 88 which serve as contacts. Five spring contact members 90 are mounted above the sleeve upon a block of insulating material 92, each contact being located directly above a circle of holes. A sixth contact 94 maintains a continuous electrical connection with the sleeve. It is the arrangement of buttons upon this sleeve which controls the sequence of movements of the box actuating mechanism (that is, controls the color of fill inserted into the cloth). If the sleeve 64 is in the position shown in Figs. 7 and 8, and a button 96 is in one of the holes in the second circle of holes, that button will be in electrical connection with the second spring contact 98, and when the circuit is energized, current will flow through solenoid 34 of the cam follower block 26. Therefore, the contact of a button in the first row of holes with the first of the contacts 30 will cause the second shuttle box to be raised into picking position, a button in the second row will position the third shuttle box, and a button in the third row will cause the shuttle box to rise to its highest position. If there is a longitudinal row of five vacant holes, the circuit will be incomplete and none of the cam follower block solenoids will be energized and the shuttle box will return to and remain in its lowest position.

If it was necessary to change the color of fill for every pick in order to weave the desired pattern, the drum would have to be advanced five degrees or one line for each pick. As there are seventy-two lines of holes in the drum as illustrated, it is possible to insert as many as seventy-two fills, each being of a different color than the next preceding. Having made seventy-two advances, the drum has made one complete revolution and the pattern now repeats itself. Buttons also may be so arranged around the sleeve 64, that for one complete revolution of the sleeve the pattern would be repeated a number of times corresponding to a divisor of seventy-two. For example, the pattern might be repeated two, three, four, six or eight times, etc. In actual practice, however, it is seldom necessary to change shuttles every pick. Therefore, if there are to be several picks of the same color, it is not necessary for the sleeve to be advanced nor for the shuttle to be changed until the completion of that portion of the pattern.

It will be noted from Fig. 7 that the drum ratchet solenoid 70, the cam follower block solenoids 32, 34 and 36, and the latch release solenoid 54, are connected in parallel to a common source of current supply 100, through the secondary contacts of a magnetic relay 102, which is normally open. Momentary energization of the relay accomplishes three functions; it energizes the drum ratchet solenoid 70, thereby retracting the pawl 84, it moves one of the three cam followers 38, 40 or 42 into the plane of the cam 44, and it causes the latch 48 to release the cam follower block 26. De-energization of the relay 102 causes the ratchet 68 to advance one tooth under the action of the spring 80. It is therefore obvious that by proper control and timing of the relay 102, the number of picks of each color which are to be woven may be predetermined.

Figs. 7, 8 and 9 illustrate the electrical controlling and timing mechanism for operating the relay 102. A driven sprocket 104 fixed to a shaft 106 is connected by means of a chain 108 to a driving sprocket 110 connected in even ratio to the loom crank shaft. The driven sprocket 104 being twice the diameter of the driving sprocket 110, turns once for every two picks of the loom. A timing disc 112 of insulating material is adjustably fixed to the shaft 106 by means of a set screw 114. Two diametrically opposite metallic segments 116 and 118 are secured to the circumference of the disc. Two contact members 120 and 122 mounted above the disc, continually engage the circumference. In Fig. 7, the source of current for actuating and closing the relay 102 is indicated at 124. It is obvious therefore that the relay can be closed only when the two contact members 120 and 122 are in contact with one of the metallic segments 116 or 118. Thus the timing of the operation of the relay in relation to the loom cycle is accomplished.

Mention was made above that it is usually neither necessary nor desirable for the color of fill to be changed every pick, and also that the color of fill is changed each time that the relay operates. It is therefore necessary to supplement the timing function of the disc 112 with a secondary timing or pick-counting mechanism by means of which the number of consecutive picks of a given color may be predetermined. This pick-counting mechanism is generally indicated by 126 in Fig. 7. It will be noted that the actuating solenoid 128 of the relay 102, the contact members 120 and 122 and the pick-counting mechanism 126 are all connected in series to the source of current 124, and that there is no electrical connection between this portion of the diagram and the lower remaining portion. As the timing disc 112 and the pick-counting mechanism 126 are in series with the relay solenoid 128, neither the timing disc nor the pick-counting mechanism can have any effect upon the relay, unless they act in conjunction (that is, unless there is a complete circuit through both).

Referring to Figs. 8 and 9, a small reduction gear 130 fixed to the shaft 106 drives a larger gear 132 fastened to the end of a shaft 134, the ratio being five to one. As stated above, the shaft 106 turns one-half revolution for every pick. Therefore, the shaft 134 turns one-tenth of a revolution for every pick. A further reduction is effected by means of two intermittent gears, the driving gear 136 being fixed on shaft 134, and the driven gear 138 being fixed to a third shaft 140. As the ratio between the two gears is ten to one, the shaft 140 turns one-tenth of a revolution for every ten picks, or at one-tenth of the speed of shaft 134.

A commutator cylinder 142 of insulating material is fixed to the shaft 134. On the right end of this cylinder adjacent the intermittent driving gear 136, is mounted a metallic slip-ring 144. Ten metallic contact studs generally indicated by 146 are embedded in the cylinder 142, being equally spaced both circumferentially and longitudinally, forming a left-hand helix of one revolution. The slip-ring 144 is electrically connected to each of the contact studs. Ten spring-pressed contact members 148 continually engage the circumference of the cylinder, and an eleventh contact 150 continually engages the slip-ring. Rotation of the cylinder 142 causes the contact studs 146 to successively engage the contact members 148, the point of electrical connection being progressively transferred from the extreme left contact to the extreme right contact. The point of electrical connection then jumps back to the extreme left, and the cycle is repeated. One complete revolution of the cylinder 142 takes place for every ten picks of the loom. A second commutator cylinder 152 similar to the first commutator cylinder 142 is fixed to the shaft 140. The cylinder 142 is provided with contact studs 154 and a slip-ring 156. Spring-pressed contact members 158 for establishing electrical connections with the studs 154 are mounted over the cylinder, and a similar contact member 160 continually bears upon the slip-ring 156. As previously explained, the shaft 140 revolves intermittently in a direction opposite to that of shaft 134, and also revolves at one-tenth of the speed of shaft 134. The point of electrical connection between studs 154 and contact members 158 therefore is progressively transferred from right to left. The point of electrical connection then jumps back to the extreme right and the cycle is repeated. One complete revolution of the cylinder 152 takes place for every hundred picks of the loom.

In Figs. 8 and 9 is shown a supporting shaft 162 of insulating material mounted over the drum 56. A group of ten depending contact fingers 164 is mounted on the supporting shaft 162 over the left-hand half of the sleeve 66, and a second group of ten similar contact fingers 166 is mounted over the right-hand half of the sleeve 66. The two sets of contact fingers are normally held in a vertical position by a restraining rod 168 of insulating material and a tension spring 170, the effect of the rod and the spring being to hold the fingers against a horizontal stop rod 172 of insulating material. The first group of contact fingers 164 is connected by means of flexible conductors 148 to the spring-pressed contact members 150 which are mounted above the commutator cylinder 142. The second group of contact fingers 166 is connected to the spring-pressed contact members 158 which are mounted above the commutator cylinder 152, but the order of the connections is reversed, as shown in Fig. 7.

As the actuating circuit for the relay solenoid 128 is a purely series combination, it becomes evident that regardless of whatever the positions of the timing disc 112 and the commutator cylinders 142 and 152, it is still necessary to establish a connection between the two groups of contact fingers 164 and 166 to complete the circuit.

The perforated sleeve 66 has two identical groups of holes 174 and 176, the holes being arranged in circles and lines as shown. Each circle consists of seventy-two holes, five degrees apart, and there are twenty circles, ten in each group. The holes are adapted to receive contact buttons 178 which may be caused to engage the lower tips of the contact fingers 164 and 166, by rotation of the drum 56. It will therefore be seen that if there are two pins (one in group 174 and one in group 176) located on a line of holes which registers with the contact fingers 164 and 166, rotatation of the timing disc 112 and the commutator cylinders 142 and 152 will, after a predetermined number of picks, complete the relay circuit.

Fig. 7 illustrates a typical example of the current flow through the electric box motion control mechanism. The live portion of the relay actuating circuit is shown by medium lines. The live portion of the relay actuated circuit which operates the cam follower solenoids 32, 34 and 36, the cam follower block release latch solenoid 54 and the drum ratchet advance solenoid 70 is shown by heavy lines. The light lines represent dead wires.

A source of relatively weak current for actuating the relay 102 may be connected to the terminals 124. The relay actuated circuit requires a stronger current, the source of which may be connected to the terminals 100.

The drum 56 has been in the position shown since the shuttle was last changed, and all of the drum contact buttons have been in contact since that time. The commutator cylinder 152 has been intermittently rotated until the eighth stud 180 came into connection with the eighth contact 182 which is connected by the lead 184 to the eighth contact finger 186 of the contacts 166, which is in connection with the contact pin 188 in the eighth hole of the top line of holes of group 176.

The commutator cylinder 142 continued to rotate even after the connection from the cylinder 152 to the pin 188 was established. Eventually the fourth stud 190 on the commutator cylinder 142 came into connection with the fourth contact 192 which is connected by the lead 194 to the fourth contact finger 196, of the contacts 184, which is in connection with the contact pin 198 in the fourth hole of the top line of holes of group 174. As a matter of fact, this connection has probably been established a number of times before, but has been ineffective because the circuit through the commutator cylinder 152 was incomplete. Shortly after the circuit through the commutator cylinders became complete, contact of the segment 116 of the timing disc 112 with the two contacts 120 and 122 completed the entire relay actuating circuit, and the relay was closed. Upon closing of the relay actuated circuit, three solenoids are actuated simultaneously. One, the drum ratchet advance solenoids 70 causes the pawl 84 to be retracted, but as explained above, does not at this time cause the drum 56 to advance. Another, the release latch solenoid 54 operates the latch 48, thereby releasing the cam follower block 26, the effect of which is to allow the drop box 20 to return to its lowest or initial position. Still another, the cam follower solenoid 34 causes the cam follower 40 to be moved into the path of the cam 44. At this time the relay actuating circuit is broken as a result of the continuous rotation of the timing disc 112, and therefore the relay actuated circuit is also broken and the solenoids 70, 54 and 34 are de-energized, and as a result, causing the drum ratchet 68 to be advanced one tooth, thereby setting the drum for the next shuttle change, and causing also the latch 48 to engage the ratchet bar 52. De-energization of the cam follower solenoid 34 has no effect upon the cam follower 40, which therefore remains in the path of the cam 44. The cam 44 now engages the cam follower 40, thereby moving the cam follower block to the third position which raises the third shuttle box to picking position. A dwell at the end of the rise on cam 44 holds the cam follower block 26 stationary for a short period. During this period, the latch 48 which has been resting upon the ratchet bar 52, falls into the third notch 200 of the ratchet bar 52, and will retain the cam follower block in that position until the next shuttle change takes place. The wedges 46 on the face of the cam 44 now forces the cam follower 40 from the path of the cam. All operations controlled by the relay take place between two successive picks.

Referring to Fig. 7, the button 202 determines which shuttle box is next to be raised to picking position. As the button is located in the third circle of holes, it follows that the fourth or bottom shuttle box is next to be raised to picking position. The two pins 204 and 206 on sleeve 66 determine how many picks shall be woven before the third shuttle box is removed from picking position, and replaced by the fourth shuttle box. Consider that the drum ratchet 68 has been advanced one tooth and that the buttons 202, 204 and 206 are now in connection with the contacts 208, 210 and 212. The button 206 is now in connection with the contact finger 212, the lead 214 and the contact 216. It is now necessary to rotate the commutator cylinder 152 four-tenths of a revolution, which will cause the stud 218 to come into connection with the contact 216. To rotate the commutator cylinder 152 four-tenths of a revolution, it is necessary to rotate the commutator cylinder 142 four revolutions, thus establishing a circuit from the button 206 to the slip ring 156. Four complete revolutions of commutator cylinder 142 of course results in the equivalent of its initial position. It is now necessary to establish a circuit between the button 204 and the slip ring 144. Three-tenths of a revolution of commutator cylinder 142 will cause the stud 220 to come into connection with the contact 222, thus completing the circuit from the button 204 to the slip ring 144 and therefore completing the circuit through both commutators. As stated above, the commutator cylinder 142 rotates one-tenth of a revolution for each pick. In this particular case the cylinder rotated four complete revolutions plus three tenths of a revolution, or a total of forty-three tenths. The shuttle in the third box would therefore remain in picking position for forty-three consecutive picks. At the end of the forty-third pick, the drop box would be lowered to its lowest position and then raised to its highest position, thereby placing the fourth shuttle box in picking position for the next pick.

A driving pin 224 is mounted upon the intermittent driving gear 136. As illustrated, the angular position of the driving pin 224 in relation to the commutator cylinder 142, is such that motion is imparted to the commutator cylinder 152 after each complete revolution of commutator cylinder 142. In other words, when the contact stud 226 is in connection with the contact 228, one-tenth of a revolution of commutator cylinder 142 will advance commutator cylinder 152 one-tenth of a revolution also.

In a preceding paragraph, the buttons 204 and 206 were so inserted, that as a result, forty-three consecutive picks of one color were woven. Suppose now that the buttons are to be moved to such positions, that forty-eight consecutive picks will be woven. The pins will of course be located upon the same horizontal line as before.

Beginning with the hole directly below the contact pin 198, count from left to right; zero, one, two, three, four, five, six. The sixth hole will be the last in the line. Now return to the extreme left and continue counting on the same line from left to right; seven and eight. Insert the button in the eighth hole 230. Now if the count is continued in the same manner, up to forty-eight, it will be necessary to return to the left four more times, five in all, and the forty-eighth count will end on the hole 230, as also did the eighth. Each time that it was necessary to return to the left, signifies that the driving pin 224 will advance the commutator cylinder 152 one-tenth of a revolution. As the number of returns was five, to find the correct position for the pin 206, it is necessary to start counting from the hole directly below the contact pin 188; zero, one, two. The second hole will be the last in the line. Now return to the left end of the line and continue counting to the right; three, four and five. Insert the pin in the fifth hole 232. It is now apparent that the pin 206 has been advanced one hole from its old location. This condition arose because of the fact that when counting off the eight holes for forty-eight consecutive picks, it was necessary to return to the left to continue the count. In other words, a fractional revolution of commutator cylinder 142 may advance the commutator cylinder 152 a tenth of a revolution, depending upon the initial position of the first commutator cylinder 142. If in counting off the unit holes it is not necessary to return to the left, count off the "ten unit" holes in the obvious manner. For example, if the number of picks is forty-eight, count, zero, one, two, three, four, and insert the pin in the fourth hole. But if in counting off the unit holes it is necessary to return to the left, add one to the required number of "ten unit" holes and place the pin in the fifth hole.

As stated above, drum 56 is capable of controlling seventy-two shuttle changes. If a given pattern requires a lesser number of shuttle changes, there will be a number of lines left over, but these lines may be worked into the pattern in such a way that one complete revolution of the drum will cause only the required number of shuttle changes. Energization of the relay actuated circuit cannot cause a shuttle change unless a button on sleeve 64 is in connection with one of the contacts 90. If there is a vacant line under the contacts 90, the drop box must return to its lower position. If the next lines are also vacant, obviously none of those lines can cause a shuttle change. Therefore the drum may be advanced either at random or once for every pick, until a line having a button moves under the contacts.

For example, suppose that it is desirable to place buttons upon the drum in such a way that one rotation of the drum will cause sixty shuttle changes. As the drum has seventy-two lines of holes, there will be twelve lines left over. Proceed as usual in setting up the pattern until a vacant line of holes is required upon sleeve 64. This indicates that the drop box will be returned to its lowest position. Assume that there are to be sixteen picks while the drop box is in this position. The next twelve lines on sleeve 64 may be left vacant, the thirteenth hole, however, receiving a button for the purpose of predetermining the next shuttle change. Each of the twelve coresponding lines on sleeve 66 will receive buttons so placed that the drum will be advanced twelve times during the sixteen picks.

If there had been eight picks with the drop box in low position, instead of sixteen, as previously assumed, it would be impossible to cause the drum to advance more than eight times while the drop box remained in low position and the four remaining advancements would necessarily be deferred until the next return of the drop box to low position.

The illustrated loom departs from the customary method of operating the harnesses from a single head-motion mounted on one end of the loom, and substitutes therefor two complementary head-motion mechanisms, one of which is located on each end of the loom. As will be seen from the following description, the two head-motion mechanisms act directly upon the harnesses, thus eliminating the harness supporting cords.

The head-motion mechanisms 11 are shown generally in Figs. 1 and 18, and more particularly in Figs. 10, 11, 12, 13 and 14. As both left and right head-motion mechanisms are similarly constructed, only the left mechanism is described in detail.

Figs. 10 and 11 are elevations illustrating the left head-motion mechanism, in picking and beating up positions, respectively. Two brackets 236 and 238 secured to the loom end frame 240 support two pairs of vertical guide rods 242 and 244. A selective harness lifting slide 246 is slidably mounted upon the vertical guide rods 242 and a harness lowering slide 248 is similarly mounted upon the guide rods 244. A horizontal cam shaft 250 journalled at opposite ends of the loom in bearings 251, is connected in even ratio to the crank shaft 252 by means of a system of chains and sprockets.

The cam shaft is provided for the purpose of raising and lowering in timed relation the selective harness lifting slide 246 and the harness lowering slide 248. A disc cam 254 positively lifts the selective harness lifting slide, and a second cam 256 supplements the action of gravity and insures positive lowering of the slide. The movements of the harness lowering slide 248 are substantially equal in amount and opposite in phase to the movement of the selective harness lifting slide. The upward movement of the harness lowering slide is positively accomplished by means of a third cam 258, and the lowering effect of gravity is positively supplemented by a fourth cam 260.

The selective harness lifting slide 246 and the harness lowering slide 248 are shown in some detail in Figs. 12 and 13 respectively. As their functions are somewhat similar, they have features in common, namely, guide rod bearings 262, cam rolls 264 which engage with the lifting cams, and horizontal bars 266 which engage with the lowering cams. The selective harness lifting slide 246 is provided with a longitudinal box 268, housing an electrically controlled harness selecting mechanism which will later be described in detail. The harness lowering slide 248 is provided with a grating or comb 270 having thirty vertical slots 272, one for each harness. Referring to Figs. 10, 11 and 14, the opposite upper corners of the harness frames 274 are provided with angle brackets 276, the horizontal legs of which are formed with a reduced portion 278 and a shoulder 280. The reduced portion 280 is adapted to fit loosely in a vertical slot 272 of the comb 270 and to project beyond the plane of the comb, as indicated by 282. The shoulder portion 280 being larger than the slots, butts against the comb, thus preventing longitudinal motion of the harness frame. The lower side of the reduced portion 278, normally rests upon a transverse support bar 284 which forms the bottom of the slots 272. It will therefore be seen that the slots 272 effectively hold the harnesses in proper spaced relation transversely and longitudinally. Since the angle brackets 276 normally rest upon the support bar 284, it follows that vertical reciprocation of the harness lowering slide 248 will also raise and lower all of the harnesses. However, in actual weaving the harnesses are never all lowered at the same time, due to intervention of the selective harness lifting slide.

In Figs. 11 and 14 the selective harness lifting slide 246 is shown in its lowest position, and the harness lowering slide 248 is shown in its highest position. In Figs. 1, 10 and 18 the reverse is true, the selective harness lifting slide being shown in its highest position, while the harness lowering slide is shown in its lowest position. In Fig. 11, note that the harnesses are all on the same level, but that in Figs. 10 and 18 some have been raised above that level, while the remainder have been lowered. The loom therefore operates on what is known as the "split shed" principle. In other words, to close the shed the high harnesses are lowered and the low harnesses are raised until the two sets of harnesses meet at an intermediate or common level.

Fig. 14 illustrates the two slides with the harnesses in "beating up" or intermediate position. The broken lines indicate the limits of movement of each slide. To form the shed the selective harness lifting slide must lift part of the harnesses to the position indicated by 286, and the remaining harnesses must be lowered by the harness lowering slide to the position indicated by 288.

As explained above, the harnesses are normally carried up and down with the harness lowering slide 248. However, the harnesses are loosely supported on the lower ends of the comb slots 272 by means of the angle brackets 276, the reduced portions of which project through and beyond the comb slots, as indicated by 282.

The projecting portions 282 provide means whereby the harness may be engaged by mechanism integral with the selective harness lifting slide 246, and thus instead of all harnesses being lowered from intermediate to bottom shed position, approximately half of the harnesses may be raised to top shed position. The selective mechanism for engaging and lifting the harnesses from intermediate to top shed position, is shown in detail in Figs. 10, 11 and 14.

A harness lifting latch 290 is provided for each harness, and as the illustrated loom has thirty harnesses, each selective harness lifting slide must have thirty harness lifting latches. The latches are slidably mounted in a series of transverse holes 292 in the lower part of the longitudinal box 268. The larger portion of each hole is circular in section, but the reduced portion 294 is square. Each latch is formed with a cylindrical portion 296 and a square end portion 298 which is beveled as indicated by 300. The square portion 298 of the latch cooperates with the square portion 294 of the hole, and thus the latch is prevented from rotating. Each latch is normally held in retracted inoperative position against the compression of a spring 302 by means of gravity actuated locks 304, the lower ends of which 306 engage the left ends of notches 308 on the latches 290. The locks are square in section and fit loosely in the cores of solenoids 310 wound upon square tubes 312, and are therefore free to move vertically, but are restrained from rotation. It is necessary for the selective harness lifting mechanism to be quite compact, as each selective unit must be in alignment with the corresponding harness. The solenoids 310 are therefore arranged in two rows of fifteen each, in staggered relation, which allows the longitudinal distance between centers of solenoids to be equal to the distance between harnesses. Because of the staggered positions of the solenoids, it is necessary to construct certain of the latches differently in regard to length and as to the position of the notch 308, but the principle of operation of each selective unit is identical.

A horizontal cam bar 314 of substantially triangular cross-section, is fastened to the support bar 284 on the bottom of the harness lowering slide 248. When the harness slides approach beating-up position, as shown in Fig. 14, the inclined face 316 of the cam bar 314 presses against the beveled ends 300 of the harness lifting latches 230, forcing the latches slightly to the left against the pressure of the springs 302. This slight movement relieves the locks 304 of all strain and friction caused by the pressure of the left ends of the notches 308 against the lower ends 306 of the locks. As the locks are made of magnetic material, energization at this time of various solenoids 310 will lift the corresponding locks out of the notches 308, thus freeing the corresponding latches from all influence of the locks.

The latches are now being held in retracted position only by the cam bar 314. The shed is now about to be formed and therefore the selective harness lifting slide begins to move upward and the harness lowering slide downward. All latches which have been unlocked due to energization of the corresponding solenoids, remain in contact with the cam bar 314, the lowering of which allows the latches to move from left to right, under the influence of the springs 302. After the relative motion between the slides has reached a certain stage, the shoulders 318 of the released latches butt against the shoulders 320 of the transverse holes 292, thus stopping the latches. Continued relative motion of the slides causes the released latches to engage corresponding harness angle brackets 282 which are raised by the harness lifting slide to top shed position. The remaining harnesses which are opposite latches which have not been released, are carried by the harness lowering slide to bottom shed position.

As soon as the pick has been inserted, the slides return to "beating-up" position, and the projecting latches which have lifted harnesses during the preceding operation, are forced to the left by the cam bar 314. Positive leveling of the harnesses during "beating-up" position is insured by means of a horizontal bar 322 mounted upon the selective harness lifting slide. This bar cooperates with the support bar 284 of the harness lowering slide, and the angle brackets 276 are held between the two, as shown in Fig. 14. The majority of the harnesses which were raised for the preceding pick will be lowered for the next pick and therefore the corresponding locking solenoids must before this time be de-energized, thereby allowing the locks to drop into engagement with the latches which are to be inoperative during the next pick. At the same time that these solenoids were de-energized, it was necessary to energize others, thus providing for the selection of harnesses which are to be lifted for the next pick.

In weaving simple fabrics, it is necessary to use only a few harnesses, while with complicated fabrics, it may be necessary to use a large number, possibly as many as thirty. Also, the number of successive harness combinations necessary for the formation of a given pattern varies greatly. It is therefore desirable to provide a harness controlling mechanism which will accommodate either a few or a large number of harnesses, and which will permit extensive variations of the pattern.

The electrical harness controlling mechanism 10 which cooperates with the selective harness lifting slides, is generally indicated in Fig. 1, and is shown in detail in Figs. 15, 16 and 17. This mechanism is capable of controlling the shedding of from two to thirty harnesses, and may be used for patterns requiring up to forty-eight successive harness combinations.

As previously described, in order to raise certain harnesses, thereby forming the desired shed, it is necessary to energize the corresponding latch solenoids 312. For example, it might be desirable to form a shed by raising harnesses Nos. 1, 3, 5, 7, etc., and at the same time lowering harnesses Nos. 2, 4, 6, 8, etc. To make this harness combination, it would be necessary to energize the odd solenoids.

Fig. 15 illustrates a front elevation of the harness controlling mechanism 324. A lower commutator cylinder 326 fixed to a shaft 328 is rotatably mounted in bearings 330 attached to end plates 332. An upper commutator cylinder 334 similar to the lower commutator cylinder, is fixed to a shaft 336, rotatably mounted in bearings 338. Each cylinder consists of a metallic sleeve electrically insulated from the shaft by means of a core of fibrous material. The sleeves are perforated for the reception of contact buttons, the holes being arranged in circles and horizontal lines as shown. Each circle contains twenty-five equi-spaced holes and there are thirty circles on each cylinder, one circle for each of the thirty harnesses. Above the lower cylinder is mounted a series of fixed spring contact members 340, and a similar series of movable spring contact members 341 is mounted above the upper cylinder, each contact registering with a circle of holes. A fixed spring brush 342, mounted at the extreme right of the lower cylinder, establishes a continuous electrical connection with the lower metallic sleeve. A second brush 343 and the contacts 341 are mounted above the upper cylinder upon a strip of insulating material 344 fixed to a square shaft 345 which is pivoted at opposite ends to the end plates 332. Mechanism for lowering and raising the upper contacts and thus rendering them operative and inoperative respectively is provided and will later be described in detail.

Referring to Fig. 19, each of the lower contacts 340 is electrically connected to the corresponding upper contact, and the two brushes 342 and 343 are also connected together. The left pair of contacts is connected by a flexible wire to the first or front solenoid of the left selective harness lifting slide and also to the corresponding solenoid of the right selective harness lifting slide. The remaining pairs of contacts are similarly connected to the corresponding solenoids. In addition to these connections, the solenoids are connected by common wires to one terminal of a low voltage source of current supply, the other terminal being connected to the pair of brushes 342 and 343. Therefore, if an electrical connection is established between a cylinder and a spring contact member, there will be a complete circuit and the two solenoids which are connected to that spring contact member will be energized. This completion of the circuit is accomplished by means of contact buttons 348 which may be inserted in the holes of the cylinders. In Fig. 15, the top line of holes of the lower cylinder is shown provided with buttons in the even numbered holes, counting from left to right. These buttons are in engagement with the even spring contact members 340. Therefore, the even solenoids of the selective harness slides are energized, and a shed will be formed having the even harnesses lifted and the odd harnesses lowered. Thus it is obvious that the arrangement of pins in each line of holes represents a predetermined harness combination.

Referring to Figs. 1, 15 and 16, a vibrating lever 350 is loosely pivoted upon the lower cylinder shaft 328, and is actuated by an eccentric 358 fixed to the left end of the cam shaft 250. The cam shaft revolves once for each pick of the loom. Motion is transmitted from the eccentric to the lever by means of an eccentric strap 354 and a link 356, the link being rigidly fastened to the eccentric strap, and pivoted to the lever at 358. A headed stud 360 fastened to the vibrating lever acts as a pivot for two pawls. The right pawl 362 is for the purpose of intermittently advancing the lower cylinder by engagement with a twenty-five tooth ratchet 364, which is fixed to the lower cylinder shaft 328. A check pawl 366 prevents retrogressive motion of the ratchet. The left pawl 368 is for the purpose of advancing the upper cylinder. To advance the upper cylinder, the left pawl must engage a twenty-five tooth ratchet 370, which is integrally fixed to a twenty-five tooth gear 372. This combination of ratchet and gear is loosely mounted upon the lower cylinder shaft. The gear 372 engages with a second twenty-five tooth gear 374 fixed to the upper cylinder 334. The direction of rotation of the upper cylinder is therefore opposite to that of the lower cylinder.

The right pawl 362 is formed with a depending finger 376 which normally rests upon the periphery of the hub 378 of the lower cylinder ratchet 364. This finger when resting upon the hub allows the pawl to engage the ratchet. However, a projecting pin 380 mounted upon the hub, prevents the pawl from engaging the ratchet tooth 382. Whenever the pin reaches a certain position, retraction of the pawl causes the depending finger to engage the pin, and the pawl is thereby raised and prevented from engaging the tooth 382. The pawl remains inoperative so long as the ratchet remains in that position, and to move the ratchet beyond that position, it is necessary to resort to another means of actuation which will be described later.

The left pawl 368 is formed with a depending finger 384 which also rests upon the periphery of the hub 378 of the lower cylinder ratchet. This finger, however, is slightly longer than the right pawl finger, and therefore when resting upon the hub, holds the left pawl up and out of engagement with the left ratchet 370. The hub 378 of the lower cylinder ratchet is provided with an elongated depression 386. Whenever the finger 384 drops into this depression, the left pawl is lowered into engagement with the ratchet 370, and repeatedly engages the ratchet so long as the hub remains in that position.

It may be observed from an inspection of Fig. 16, that the left finger 384 will drop into the depression 386 before right finger 376 is raised by the pin. Therefore, when the left finger first drops into the depression, both ratchets will be advanced, the depression moving forward with the left finger, and as a result, both the upper and lower cylinders will be advanced. On the next retraction of the pawls, the right finger will engage the pin 380 and raise the right pawl out of engagement, but as the depression 386 is elongated, the left finger will ride back and forth along the bottom of the depression, and the left pawl will remain in ratchet-engaging position.

Consider that the pin 380 has just passed beyond the right pawl finger 376. The right pawl is now in operative position, but the left pawl is not. Twenty-four vibrations of the lever 350 will nearly complete one revolution of the lower cylinder and will result in rendering the right pawl inoperative, and the lower cylinder will remain in that position until moved by other means. However, upon the twenty-fourth vibration, the left pawl 384 became operative, and the upper cylinder was advanced one step. Each additional vibration of the lever will advance the upper cylinder one step until some force acts upon the lower cylinder, causing that cylinder to advance one step further, thereby carrying the pin 380 and the depression 386 past the pawl fingers 376 and 384. The mechanism for advancing the lower cylinder an additional step will now be described.

The upper cylinder is provided with a radial stop 388 which may bear against either the top or the bottom of a horizontal stop rod 390 fixed to the left end plate 332. Therefore the cylinder is not free to make a complete revolution, its movements being restricted to radial oscillations. The cylinder is normally held in the position shown by means of a coiled torsion spring 392. Rotation of the cylinder, due to the action of the left pawl is therefore opposed by the spring, and if the cylinder is released, it will return to its initial position.

It may be well to state at this time in reference to the placement of buttons upon the cylinders, that twenty-four lines of the lower cylinder must always be used, regardless of the number of harness combinations necessary for weaving the pattern, and also that the twenty-fifth line must always be left vacant. On the upper cylinder, however, the number of lines used depends upon the number of necessary harness combinations, but there must always be at least one line of vacant holes.

A disk 394 fixed to the lower shaft 328 adjacent the right end of the cylinder is provided with a fixed radial tooth 396. When the right pawl 368 becomes inoperative, and the lower cylinder therefore ceases to rotate, this tooth points substantially towards the upper shaft 336.

A second disk 398 is fixed to the upper shaft 336 directly above the lower disk 394. This disk, 398, is provided with twenty-five equi-spaced radial holes. A second removable tooth 400 may be inserted in any one of the holes, with the exception of the twenty-fifth hole which is never used. That hole normally points towards the lower shaft.

Intermittent rotation of the upper cylinder causes the upper tooth 400 to eventually engage the lower tooth 396, thereby advancing the lower cylinder one line, and at the same time rotating the hub 378 an equal amount which results in terminating the action of the left pawl and in reestablishing the action of the right pawl. As illustrated, the upper tooth is in the twelfth hole, the position which it would occupy when twelve lines of the upper cylinder were in use.

As stated above, the upper cylinder is advanced step by step against the torsion spring 392. It is therefore necessary to provide means for preventing retrogression of the cylinder during the return strokes of the left pawl 368. As illustrated in Figs. 15, 16 and 17, a twenty-five tooth ratchet 402 is fixed to the upper shaft 336, adjacent the left end of the cylinder. A check pawl 404 engages the ratchet during the advance motion of the upper cylinder, but when that motion is complete, the pawl is forced out of engagement, and the upper cylinder is returned to its initial position by the torsion spring.

In Fig. 17 the upper cylinder is shown in its normal or inactive position. The pawl 404 is pivoted at 406 to the short end of a supporting lever 408, and a small stud 410 prevents the pawl from engaging the ratchet. The lever 408 is fulcrumed upon the end of the stop rod 390, and is held in the position shown by means of a compressed spring 412 supported by a screw 414 which passes through a loose hole in the lever and is screwed into the back plate 416, the head of the screw acting as a stop for the lever. Moving the lower end of the lever to the right against the compression of the spring 412, allows the pawl to engage the ratchet, and similarly, release of the lower end of the lever lifts the pawl out of engagement with the ratchet, and releases the upper cylinder, allowing the cylinder to return to its initial position.

As the lower cylinder approaches its stopped position, a fixed stud 418 protruding from the left end of the cylinder, engages an inclined surface 420 at the lower end of the pawl-supporting lever 408, thereby moving the lever to the right and causing the pawl 404 to engage the ratchet 402. When the cylinder has stopped, the stud 418 is in engagement with an upper semi-circular indentation 422 located adjacent the inclined surface 420. On the next forward movement of the vibrating lever 350, both cylinders are advanced, it being the first advance of the upper cylinder and the twenty-fourth or last advance of the lower. The stud 418 has now moved down to the lower semi-circular indentation 424, the check pawl 404 being still in engagement. The lower cylinder now remains stationary for a period while the upper cylinder advances step by step. This condition continues until the upper tooth 400 engages the lower tooth 396, as explained above. Thereupon, the rotation of the lower cylinder is continued and the stud 418 moves down and out of engagement with the pawl support lever 404, the spring 392 moving the lever to the left and lifting the check pawl 404, thus releasing the upper cylinder, which rapidly returns to its initial or inactive position. The cycle is now repeated.

On the lower cylinder, the line of holes 426 which is in alignment with the tooth 396 is never used. When the lower cylinder is in its stopped position, that line registers with the lower contacts 340, and therefore those contacts are inoperative during the period that the cylinder remains stationary.

The upper cylinder is illustrated in its normal or inactive position. The line of holes directly below the upper contacts is never used, and therefore, the upper contacts are necessarily inoperative so long as the cylinder remains in its initial position.

As previously described, the upper contacts are mounted upon the pivoted rod 345. A torsion spring 427 tends to keep the contacts in the lower or operative position, but an adjustable screw 428 secured to the strip of insulating material 344 is in continual engagement with the upper end of the pawl-supporting lever 408, and as a result the contacts remain in operative position only during the advance movements of the upper cylinder, being raised as soon as the cylinder begins its sudden return movement. Thus, upon the return movement of the upper cylinder, the buttons are prevented from striking the upper contacts, which would interfere with the selection of harnesses.

Suppose that a given pattern required thirty-five successive harness combinations. As each line of holes controls a single harness combination, it would be necessary to use twenty-four lines of the lower cylinder and eleven lines of the upper cylinder, a total of thirty-five. The removable tooth 400 would be inserted in the eleventh hole 429 of the upper disk 398, counting clockwise as viewed in Fig. 16.

It might be desirable to weave a pattern requiring, for example, only seven harness combinations. As it is always necessary to use twenty-four lines of the lower cylinder, the harness combination would be repeated three and three-sevenths times upon the lower cylinder, and would be completed upon the upper cylinder. In other words, twenty-four lines of the lower cylinder and four lines of the upper cylinder would be used. The removable tooth 400 would be inserted in the fourth hole 430 of the upper disk 398.

As previously described, the raising and lowering of the harnesses between intermediate and top shed positions is positive. The selective harness-lifting slide raises the harnesses to a common horizontal level, a method which is satisfactory when only a few harnesses are in use, as when weaving simple fabrics. However, when a large number of harnesses are in use, it is desirable to raise the harnesses in such a way that the warp ends will all be in the same plane, forming a sharply defined shed. It is therefore necessary to raise each harness a different amount, the front harnesses being raised the least, and the back harnesses the most. This is accomplished by means of an upper harness-evener mechanism 432 generally shown in Fig. 1, and in detail in Figs. 10 and 11. Two of these mechanisms are used, one for each end of the loom, but it is only necessary to illustrate and describe the one on the left end.

A rigid support bracket 434 secured to the loom end frame 240 is provided with studs 436, two at each end. The inner ends 438 of the studs are reduced in diameter, and serve to loosely support a slide bar 440, which is somewhat similar to the support bracket 434, being formed with vertical portions 442 at each end. The bar 440 is normally held against the stud shoulders 444 by means of compressed springs 446 which are retained upon the ends of the studs by washers and cotter pins. A harness lifting bar 448 is fastened to the inside of the slide bar 440 by a pivot pin 450. The opposite end of the bar 448 is pivoted to a link 452, the lower end of which is provided with a sliding stud 454, the movement of which is restrained by a horizontal slot 456 in the slide bar 440. A tension spring (not shown) causes the stud 454 normally to engage the right end of the slot 456, and therefore the normal position of the bar 448 is horizontal.

As shown in Figs. 10 and 11, the normal position of the harness-lifting bar is quite close to the ends of the harnesses. Two studs 458 and 460 are attached to the end of each harness. The lower studs 460 of all harnesses which have been raised to the limit of movement of the selective harness-lifting slide 246, form a horizontal line just above the normal position of the bar 450. Pressure upon the slide bar 440 causes the harness-lifting bar 448 to move to the right and to assume a position under the studs 460. If at this time the sliding stud 454 is moved to the left, the link 452 will raise the bar 448 to the position shown in Figs. 1 and 11, thereby engaging the lower studs 460 of the raised harnesses, and raising the harnesses additional varying amounts. As a result, the upper warp ends are all raised an equal amount, and a clearly defined top shed is formed.

The harness-evener mechanism is actuated by means of a cam block 462 mounted upon the pitman rod 463. The cam block is formed with two upright members having angular vertical cam surfaces 464 and 466. The right cam surface 464 is provided for engagement with an outwardly projecting stud 468 which is fixed to the slide bar 440. The left cam surface 466 engages with the outer end of the sliding stud 454 which is shouldered in order that it may thrust against the slide bar. The two cam surfaces engage the studs 468 and 454 upon the backward motion of the pitman rod, thereby causing the harness-lifting bar to move under the harness studs 460. A vertical projection 470 adjacent the left cam surface, in addition, moves the sliding stud 454 to the left, thereby raising the harness-lifting bar 448. Continued movement of the pitman rod allows the cam block 464 to be lowered, thus ending the engagement with the follower studs 454 and 468. The harness-evener now returns to its normal position, the harnesses being lowered to a horizontal level once more as determined by the position of the selective harness-lifting slide.

Ordinarily the weight of the harnesses is sufficient to cause them to drop from intermediate to bottom shed position. However, the harness brackets 276, being loosely supported by the lower ends of the comb slots 272 might occasionally stick or bind and fail to reach their proper low positions. Therefore, both harness-lowering slides are provided with a supplementary mechanism which insures positive lowering of the harnesses. Only the left mechanism is illustrated and described, as the two are similar.

Referring to Figs. 1, 10, 11, 12 and 13, a lever cam 472 is pivoted at 474 to the lower front corner of the harness-lowering slide 248. A similar lever cam 476 is pivoted to the lower back corner. One extremity of a transverse rod 478 is flexibly secured to the lower end of the back lever cam 476. The other end of the rod 478 is guided by a slot 480 in the lower portion of the front lever cam 472, being secured in that position by means of washers and cotter pins. A compressed spring 482 surrounds the lower portion of the front lever cam, and normally holds the rod 478 against the lower end of the slot 480. The upper cam portion 484 of each lever cam is adapted to engage actuating studs 486 fixed to the selective harness-lifting slide. Two flat springs 488 fastened to the harness-lowering slide, press against the upper ends of the lever cams and tend to rotate the lever cams in a counter-clockwise direction. When the harnesses are in the "beating-up" position, as shown in Fig. 10, the upper cam portions 484 are in engagement with the cam-actuating studs 486 and the lever cams are held erect.

Relative movement of the harness slides causes the lever cams to become disengaged from the cam-actuating studs 486. Under the influence of the flat springs 488, the lever cams are rotated slightly, thereby moving the transverse rod 478 to the right, its movement being continued until arrested by the harnesses. Previous to the movement of the transverse rod 478, the slides have caused the harnesses to slightly separate, forming two groups, and as a result the upper harness studs 458 also separate into two groups, thereby forming an upper and a lower line of studs. The movement of the transverse rod to the right therefore positions the rod between the two lines of studs and continued downward movement of the harness-lowering slide causes the rod to press down upon the lower line of studs, thereby positively aiding the downward movement of the descending harnesses.

Referring to Fig. 1, as the harness-lowering slide approaches its lowest position, the lower edges of the harnesses successively come to rest upon two inclined bars 490 which act as harness-eveners. The bars are formed with steps as shown. The front ends of the bars are highest, and therefore the front harness is stopped first. As soon as the front harness reaches the inclined bars, the upper stud 458 can no longer move in a downward direction, and therefore the downward motion of the front end of the transverse bar 478 is arrested. Upon the further descent of the harness-lowering slide, the front end of the transverse bar remains stationary, and the spring 480 is compressed. The rear end of the transverse bar continues to move downward until the last harness comes to rest upon the harness-evener bar 490, at which time the descent of the harness-lowering slide becomes completed.

What is claimed is:

1. A loom comprising a main shaft, a drop box and head motion drum controls operated respectively from the main shaft in timed relation therewith, a drop box lifting mechanism, a harness motion, electrical circuits for predeterminedly controlling the two mechanisms from the drum controls, and separate means operating through said circuits to render each of the mechanisms capable of manual preselection.

2. A loom comprising a constantly rotating commutator cylinder, an intermittently operating pattern control having a series of contacts capable of operation by the operator, a solenoid operated box lifting mechanism, and electrical circuit connections for preselecting the solenoids determined by the contacts on the pattern drum.

3. A loom comprising a drop box, a lay carrying the drop box, connections for altering the position of the drop box on the lay, pattern control mechanism, a series of solenoids for preselecting the position of the drop box, and electrical circuit connections between the pattern control mechanism and solenoids for operating any one of the latter.

4. A loom comprising a continuously operated commutator, a pattern control member, a drop box, means for actuating the drop box, and electrical circuit connections for controlling the actuator means governed in turn by the commutatator and pattern control.

5. A loom comprising a common drive, two pattern control drums, means for actuating each drum from the common drive, harness frames and drop boxes, and electrical circuit connections for individually controlling the operation of the harness frames and drop boxes from the separate pattern control drums.

6. A loom comprising a drop box, drop box lifting mechanism, a series of harness frames, pattern drums, and electrical control mechanism associated with the drums for automatically governing the operation of the drop box lifting mechanism and harness frames according to a predetermined and preselected cycle.

7. In a loom, a pattern drum having contact members disposed thereabout in predetermined relationship, a pick control member, means for continuously rotating the pick control member in timed relation to the loom, means for intermittently advancing the drum during the continued rotation of the pick control member and in accordance with the predetermined location of the contacts thereon, a drop box, mechanism for determining the position of the drop box to properly locate a shuttle therein, and electrical circuits for operating the mechanism controlled by the intermittent advance of the pattern drum.

8. A loom comprising a drop box, a plurality of shuttles located in the drop box, and means for altering the position of the drop box to selectively control the position of the shuttles comprising a pattern drum, contact members disposed thereabout, a rotating pick counter, means for intermittently advancing the pattern drum after a predetermined number of picks, and electrical circuits selectively controlled by the advance of the pattern drum to modify the position of the drop box.

9. In a loom, a drop box, a pattern drum, contact members located on the drum to predetermine the operation of the drop box, means for advancing the drum, a series of solenoids corresponding in number with the shuttles in the box, circuits controlled by the drum for operating the solenoids in accordance therewith, and a rotating cam for determining the position of the drop box in accordance with the solenoid which is energized.

FRANK D. LINDQUIST.